United States Patent Office 2,909,495
Patented Oct. 20, 1959

2,909,495

CARBOXYL RICH ALKYD RESIN-ETHOXYLINE RESIN COMPOSITIONS AND PROCESS FOR THEIR PREPARATION

Joseph Rosenberg, Schenectady, N.Y., assignor to General Electric Company, a corporation of New York No Drawing. Application August 25, 1954
Serial No. 452,221

10 Claims. (Cl. 260—22)

My invention relates to new and useful resin compositions. More particularly, the invention relates to resin compositions having improved desirable physical and electrical characteristics.

Resins of the alkyd type are well-known as being the reaction products of polyhydric alcohols and polybasic or polycarboxylic acids. Epoxy or ethoxyline or epoxide resins are also known in the art. For example, U.S. Patent 2,324,483, Castan, discloses epoxy resins comprising the reaction product of phenols having at least two phenolic hydroxy groups and an epihalogenohydrin, e.g. epichlorhydrin (the product being cured to the substantially thermoset stage by the use of a polycarboxylic anhydride or acid such as phthalic anhydride). The resinous reaction products are generally complex resins comprising a polyether derivative of the polyhydric phenol used containing epoxide groups, are known variously as epoxide, epoxy, and ethoxyline resins and are sold, for example, under the trade-names of Epon and Araldite resins. Such resins may be easily converted to the substantially thermoset stage by means of a cure accelerator such as phthalic anhydride or other polycarboxylic acids and anhydrides. It has been found that ethoxyline resins have poor flame-retardant properties, exhibit an undesirable decrease in strength at elevated temperatures, and have increasingly poor electrical properties at elevated temperatures. Copending patent application Serial No. 305,913, filed August 22, 1952, now U.S. Patent 2,744,845, describes the curing of the ethoxyline resins in combination with hexachloroendomethylenetetrahydrophthalic anhydride to obtain resins having improved hardness and electrical qualities at high temperatures. While these properties, among others, are very useful, there is a definite need for compositions comprising ethoxyline resins having the desirable high temperature properties of resins cured with hexachloroendomethylenetetrahydrophthalic anhydride which are also flexible. For example, ethoxyline resin compositions cured with hexachloroendomethylenetetrahydrophthalic anhydride would, because of their electrical characteristics and heat resistance, be very useful as stator bar insulation for electrodynamic machinery except that such a use requires a flexible resin. Flexibility and flame resistance are also required, for example, in bus bar insulation for electrical equipment.

It is, therefore, an object of my invention to provide resin compositions comprising ethoxyline resin which are heat and flame-resistant and which have suitable electrical characteristics and are flexible.

Briefly stated, my invention comprises combining (1) a carboxyl rich alkyd, or one containing free carboxyl groups, comprising the reaction product of a higher saturated or unsaturated fatty acid with hexachloroendomethylenetetrahydrophthalic acid or anhydride, (2) a complex epoxide resin containing epoxy groups and comprising a polyether derivative of a polyhydric organic compound, such as a polyhydric alcohol or phenol, and (3) hexachloroendomethylenetetrahydrophthalic anhydride. These resinous compositions are characterized by desirable physical characteristics at the operating temperatures of electrical devices.

The features of my invention which I believe to be novel are set forth with particularity in the appended claims. My invention itself, however, both as to its organization and method of operation, together with further objects and advantages thereof, may best be understood by reference to the following description.

The ethoxyline resins defined above as utilized in my invention are well-known in the art. They are described in Castan Patents 2,324,483 and 2,444,333, British Patent 518,057, and British Patent 579,698. Generally, the ethoxyline resins described therein are the reaction product of an epihalogenohydrin such as epichlorohydrin and a phenol having at least two phenolic hydroxy groups, such as bis-(4-hydroxy phenyl) dimethylmethane. U.S. Patents 2,494,295; 2,500,600, and 2,511,913 also disclose ethoxyline resins which may be used in connection with the present invention. The above patents are hereby incorporated by reference into this application. The ethoxyline resins used herein contain more than one epoxy group per molecule. They may be prepared by reacting a polyhydric alcohol or phenol, such as hydroquinone, resorcinol, glycerin, and condensation products of phenols with ketones, for example, bis-(4-hydroxy phenol) 2,2-propane with epichlorhydrin. As an example, the reaction of epichlorhydrin with bis-(4-hydroxyphenal)-2,2-propane may be illustrated as follows:

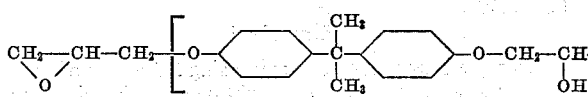

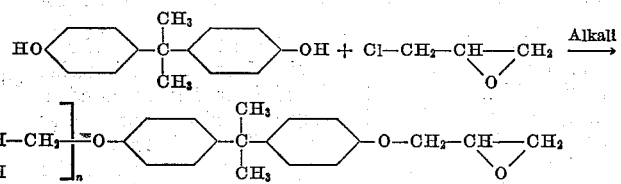

where $n$ has an average value ranging from about 0 to about 7. Such ethoxyline resins are sold under the name of Epon resins by Shell Chemical Corporation, or under the name Araldite by Ciba Company. Pertinent data on Epon resins are given in Table I below:

TABLE I

| Epon No. | Epoxide Equivalent | Approximate Esterification Equivalent | M.P., ° C. |
|---|---|---|---|
| 828 | 192 | 80 | 9 |
| 834 | 225–290 | 105 | 20–28 |
| 1001 | 450–425 | 130 | 64–76 |
| 1004 | 905–985 | 175 | 97–103 |
| 1007 | 1,600–1,900 | 190 | 127–133 |
| 1009 | 2,400–4,000 | 200 | 145–155 |
| 1062 | 140–165 | | Liquid |
| 1064 | 300–375 | 105 | 40–45 |

The carboxyl rich alkyd resin of my invention is made by reacting hexachloroendomethylenetetrahydrophthalic anhydride or acid with a monoglyceride of a fatty acid having more than twelve carbons. It has been found that monoglycerides of fatty acids having twelve or fewer carbons do not produce flexible materials. Care is taken that the hexachloroendomethylenetetrahydrophthalic acid or anhydride is present in excess over the amount of monoglyceride used to furnish a carboxyl rich alkyd. Thus, I may employ for each mol of monoglyceride from 0.7 to 1.5 mols and, preferably one mol hexachloroendomethylenetetrahydrophthalic acid or anhydride. Various monoglycerides may be used, for example those of ricinoleic acid, tridecylic acid, myristic acid, pentadecylic acid, palmitic acid, margaric acid, stearic acid, oleic acid, and the like, the only limitation being that the fatty acid should have at least thirteen carbons. Hydrogenated monoglycerides, of which the hydrogenated monoglyceride of ricinoleic acid is an example, are also useful in connection with my invention.

It has been found that useful alkyds for the purpose of this invention have an acid number of about 18 to 35. Preferably I use such resins having an acid number of from about 25 to 35 and, most preferably, about thirty. Such alkyds are prepared by heating a mixture of hexachloroendomethylenetetrahydrophthalic acid or anhydride and monoglyceride in proper mol or proportions from one to three hours or more at a temperature of from 150°–250° C. It will be realized, of course, that the reaction is of a time-temperature nature and that lower temperatures require a longer time of reaction while the reaction at higher temperatures requires a shorter time. The reaction is allowed to proceed until the required acid number is obtained and the monoglyceride is essentially esterified. Specific examples of alkyd resin preparation are set forth hereinafter.

The proportion of alkyd resin, ethoxyline resin, and hexachloroendomethylenetetrahydrophthalic anhydride may be very dependent upon the specific characteristics desired in the final cured product. Generally, for a material which has desirable electrical characteristics as well as flexibility, I prefer to limit the relative parts by weight of the material to from about 300 to 650 parts of alkyd, 100 parts of ethoxyline resin, and 4 to 40 parts of hexachloroendomethylenetetrahydrophthalic anhydride.

Just as the amounts of ingredients in my resinous end product may be varied, so may the method of combining them. Preferably the alkyd and ethoxyline resins are mixed together, and heated to about 150° C. to 170° C., and the hexachloroendomethylenetetrahydrophthalic anhydride added to the mixture and then cured. The time of reaction will vary depending upon the exact temperature used and upon the type of end product desired, i.e. liquid which may be stored and later further cured, a tacky resinous solid which may be used as is or further cured at a later time, or a more fully cured resin.

The following examples will serve to illustrate the practice of my invention so that those skilled in the art may better understand it.

*Example 1*

An alkyd resin was prepared by heating 186.3 grams (0.5 mol) hexachloroendomethylenetetrahydrophthalic acid and 194.4 grams (0.5 mol) glyceryl monoricinoleate at a temperature of 195° C. for seven and one-half hours. The acid number was 28.5. The alkyd was added in the amount of 33.4 grams to 10 grams of Epon 834 resin and heated with mixing to a temperature of 150° C. Hexachloroendomethylenetetrahydrophthalic anhydride in the amount of 3.1 grams was then added to the mix which was cured for three hours at 150° C. The product was flexible and tough at temperatures from about 20° C. upward. A strip one-eighth inch thick was resistant to tearing during the course of wrapping coils, bus bars, and the like. The 60-cycle power factor at various temperatures was as follows: 25° C., 4.50%; 50° C., 6.80%; 75° C., 1.98%; 100° C., 2.10%. This resin is particularly useful for insulation exposed to high temperatures and which at such higher temperatures must have a low power factor and other desirable electrical characteristics.

*Example 2*

53.1 grams of an alkyd resin prepared as in Example 1 was added to 10 grams of Epon 834 resin and heated with mixing to 150° C. Then 1.3 grams of hexachloroendomethylenetetrahydrophthalic anhydride were added and the mixture cured for three hours at about 150° C. The product was flexible and tough at temperatures from about 20° C. and higher. The 60-cycle power factors were as follows: 25° C., 8.00%; 50° C., 4.20%; 75° C., 1.13%; 100° C., 5.60%. This resin has the same uses as that of Example 1.

*Example 3*

63.1 grams of an alkyd resin prepared as in Example 1 having an acid number of 30.1 was added to 10 grams of Epon 834 resin and heated with mixing to a temperature of 150 C. When no hexachloroendomethylenetetrahydrophthalic anhydride was added and the resin cured for three hours at 150° C., only a soft mass resulted which was not useful for the present purpose. When one gram of hexachloroendomethylenetetrahydrophthalic anhydride was added to the alkyd-epoxy resin mix before curing, a resin was produced which was useful at lower temperatures but which softened at about 100° C. When 2.0 grams of hexachloroendomethylenetetraphthalic anhydride was added before curing, the product was flexible and tough at temperatures of about 20° C. and higher. The material in sheet form was resistant to tearing and had a 60-cycle power factor as follows: 25° C., 7.51%; 50° C., 5.33%; 75° C., 1.47%; 100° C., 6.20%. This resin is also useful for the same purposes as that of Example 1.

*Example 4*

Example 3 was repeated with the exception that 3.0 grams of hexachloroendomethylenetetrahydrophthalic anhydride were used for curing. The product again was flexible, tear-resistant, and had the following 60-cycle power factor: 25° C., 7.59%; 50° C., 7.36%; 75° C., 1.70%; 100° C., 4.81%. This resin has the same uses as the above resins.

*Example 5*

Example 3 was repeated using 4.0 grams of hexachloroendomethylenetetrahydrophthalic anhydride for the curing stage. The flexible, tear-resistant product which is useful at high temperatures had a 60-cycle power factor at 25° C., 6.20%; 50° C., 7.79%; 75° C., 1.63%; 100° C., 3.26%.

*Example 6*

Example 3 was repeated again using 5.0 grams of hexachloroendomethylenetetrahydrophthalic anhydride for the cure. Flexible, tear-resistant resin which again is useful at high temperatures had the following 60-cycle power factor: 25° C., 5.41%; 50° C., 8.11%; 75° C., 2.28%; 100° C., 2.62%.

The above examples are illustrative of the useful compositions of my invention. In general, it was found from experiments carried out that flexible resins having desirable electrical properties were obtained when with 100 parts by weight of ethoxyline resin the alkyd resin varied from 300 to 650 parts by weight, and the hexachloroendomethylenetetrahydrophthalic anhydride varied from about 4 to 40 parts by weight.

Experiments were also carried out to determine the optimum alkyd resin acid number range. It was found that when the acid number fell below about 25, the resulting resins tended to have too high a power factor for high temperature use. With acid numbers above about 35, the resin composition tended to be too rigid. I prefer using alkyd resins having an acid number of about 30 when a flexible resin having good electrical characteristics at high temperatures is indicated.

Further experiments were carried out similarly as above but using phthalic anhydride or acid in lieu of hexachloroendomethylenetetrahydrophthalic anhydride or acid and in about the same amounts in preparing the alkyd resin component. These resins had undesirably high 60 cycle power factors ranging from about 4% at 25° C. to about 70% at 100° C. Another commercially available flexible ethoxyline resin had a 60 cycle power which ranged from 40% at room temperature to almost 100% at 50° C.

Likewise, phthalic anhydride, as typical of the usual curing agents, was used in lieu of hexachloroendomethylenetetrahydrophthalic anhydride to cure resins composed of a hexachloroendomethylenetetrahydrophthalic alkyd and ethoxyline resin combination, as in the above examples. It was found that the resin had an excessive power factor, especially at the higher temperatures.

The compositions of my invention are, as pointed out above, very useful in insulating applications in which the material must be flexible and at the same time have desirable electrical characteristics at higher temperatures. Of course, either of these properties may be sacrificed varying other proportions of the alkyd resin, ethoxyline resin, and hexachloroendomethylenetetrahydrophthalic anhydride can be used.

My new materials may also be formed into tape which is flexible, tear-resistant, and very useful for the wrap insulation of apparatus such as bus bars, coils, and the like. They may also be used as a casting medium for devices such as coils, transformers, and the like. In this connection, a sample with embedded electrodes made for test purposes showed no corona effect up to about 15 kv., the electrodes being spaced one-quarter inch apart. The ability of the resins of my invention to withstand temperatures cycling between about −40° C. and 125° C. and higher and at the same time having low electrical losses makes them very efficacious in many applications, as does their resistance to heat and their flame-retardancy.

My new resinous compositions are also very useful in coating or impregnating textile or glass, or other types of tape which are to be used for insulating and other purposes. Acetone and other well-known polar solvents are used to dissolve the resins. If desired, other liquids, such as toluene, xylene, benzene, Cellosolve acetate, ethyl acetate, and the like may be used in conjunction with the primary solvent. Varying concentrations of solvent may be used according to the degree of coating desired and the use of the final product. The material to be coated or impregnated is passed through the solution and then dried and cured. These materials are particularly useful where an insulation which is flexible, has low power factors at high temperatures and is fire-retardant, is required.

The resinous products of my invention may also be used in preparing laminated materials, adhesives, and the like. Filler materials of various kinds and characteristics can be added to the resins herein provided to make structures or compositions having particular desired properties. For example, they may be filled with magnetic powders to provide magnets. Other fillers include silica, mica, asbestos, titanium dioxide, clay, carbon graphite, etc. Many other uses for such resins will occur to those skilled in the art.

While I have described this invention in connection with certain specific examples, I wish it to be understood that I desire to protect in the following claims all variations of my invention which do not depart from the spirit or scope thereof.

What I claim as new and desire to secure by Letters Patent of the United States is:

1. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of a monoglyceride of a fatty acid having at least 13 carbon atoms, said alkyd resin having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

2. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of monoglyceride of a fatty acid having at least 13 carbon atoms, said alkyd resin having an acid number of from about 25 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

3. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of a monoglyceride of a fatty acid having at least 13 carbon atoms, said alkyl resin having an acid number of about 30, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

4. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of glyceryl monoricinoleate and having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

5. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of hydrogenated glyceryl monoricinoleate and having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

6. A composition of matter comprising the reaction product of (1) from about 300 to 650 parts by weight of a carboxyl rich alkyd resin comprising the reaction product of from about 0.7 to 1.5 mols of a material selected from the class consisting of hexachloroendomethylenetetrahydrophthalic anhydride and hexachloroendomethylenetetrahydrophthalic acid and about one mol of a monoglyceride of stearic acid and having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two hydroxy groups, and (3) about 4 to 40 parts by weight of hexachloroendomethylenetetrahydrophthalic anhydride.

7. A composition of matter comprising the reaction product of (1) about 300 to 650 parts by weight of a carboxyl rich alkyd resin comprising the esterification product of from about 0.7 to 1.5 mols of a material selected from the class consisting of hexachloroendomethylenetetrahydrophthalic anhydride and hexachloroendomethylenetetrahydrophthalic acid and about one mol of the monoglyceride of oleic acid and having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) hexachloroendomethylenetetrahydrophthalic anhydride.

8. A composition of matter comprising the reaction product of (1) about 300 to 650 parts by weight of a carboxyl rich alkyd resin comprising the esterification product of from about 0.7 to 1.5 mols of material selected from the class consisting of hexachloroendomethylenetetrahydrophthalic anhydride and hexachloroendomethylenetetrahydrophthalic acid and about one mol of monoglyceride of palmitic acid and having an acid number of from about 18 to 35, (2) about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (3) about 4 to 40 parts by weight of hexachloroendomethylenetetrahydrophthalic anhydride.

9. The process of preparing a heat and flame resistant, flexible resinous composition which comprises (1) mixing about 300 to 650 parts by weight of a carboxyl rich alkyd resin, said alkyd resin being the esterification product of from about 0.7 to 1.5 mols of a material selected from the class consisting of hexachloroendomethylenetetrahydrophthalic anhydride and hexachloroendomethylenetetrahydrophthalic acid and about one mol of a monoglyceride of a fatty acid having at least 13 carbon atoms, with about 100 parts by weight of a complex epoxide resin containing epoxide groups and comprising a polyglycidyl ether of a polyhydric organic compound selected from the class consisting of polyhydric alcohol and phenols having at least two phenol hydroxy groups, and (2) adding to said mixture about 4 to 40 parts by weight of hexachloroendomethylenetetrahydrophthalic anhydride, and (3) curing with heat at an elevated temperature.

10. The process of preparing a heat and flame resistant flexible resinous composition which comprises (1) mixing and heating at a temperature of the order of 150° C. to 170° C. about 300 to 650 parts by weight of a carboxyl rich alkyd resin, said alkyd resin being the esterification product of from about 0.7 to 1.5 mols of a material selected from the class consisting of hexachloroendomethylenetetrahydrophthalic anhydride and hexachloroendomethylenetetrahydrophthalic acid and about one mol of a monoglyceride of a fatty acid having at least 13 carbon atoms, with about 100 parts by weight of a complex epoxide resin containing epoxide groups and comprising a polyglycidyl ether of a polyhydric organic compound selected from the class consisting of a polyhydric alcohol and phenols having at least two phenol hydroxy groups, and (2) adding to said mixture about 4 to 40 parts by weight of hexachloroendomethylenetetrahydrophthalic anhydride and (3) curing with heat at an elevated temperature.

References Cited in the file of this patent

UNITED STATES PATENTS

| | | |
|---|---|---|
| 2,324,483 | Castan | July 20, 1943 |
| 2,606,910 | Herzfeld et al. | Aug. 12, 1952 |
| 2,691,004 | Doyle | Oct. 15, 1954 |

UNITED STATES PATENT OFFICE
CERTIFICATE OF CORRECTION

Patent No. 2,909,495                                                              October 20, 1959

Joseph Rosenberg

It is hereby certified that error appears in the printed specification of the above numbered patent requiring correction and that the said Letters Patent should read as corrected below.

Column 6, line 13, after "mol of" insert -- a --; column 7, line 26, after "(3)" insert -- about 4 to 40 parts by weight of --.

Signed and sealed this 19th day of April 1960.

(SEAL)
Attest:

KARL H. AXLINE
Attesting Officer

ROBERT C. WATSON
Commissioner of Patents